US006761361B2

(12) United States Patent
Taylor et al.

(10) Patent No.: US 6,761,361 B2

(45) Date of Patent: Jul. 13, 2004

(54) DRILL AND DRIVE APPARATUS WITH IMPROVED TOOL HOLDER

(75) Inventors: Steven H. Taylor, Crestwood, KY (US); Gregory A. Phillips, Lagrange, KY (US)

(73) Assignee: Credo Technology Corporation, Wilmington, DE (US)

( * ) Notice: Subject to any disclaimer, the term of this patent is extended or adjusted under 35 U.S.C. 154(b) by 0 days.

(21) Appl. No.: 10/215,555

(22) Filed: Aug. 9, 2002

(65) Prior Publication Data

US 2004/0026877 A1 Feb. 12, 2004

(51) Int. Cl.[7] ........ B23B 31/22

(52) U.S. Cl. ........ 279/75; 279/14; 279/904

(58) Field of Search ........ 279/22, 30, 75, 279/904, 905, 143–145, 14; 81/438, 439; 408/239 R; 7/165

(56) References Cited

U.S. PATENT DOCUMENTS 1,805,005 A 5/1931 Philips
2,224,480 A 12/1940 Kartarik
2,338,765 A 1/1944 Hartman
2,792,726 A 5/1957 Vick
2,826,104 A 3/1958 Morin
3,023,015 A 2/1962 Pankow
3,053,118 A 9/1962 Lavalle
3,583,715 A 6/1971 Jahrl
3,735,993 A * 5/1973 Seibert ........ 279/75
4,092,753 A 6/1978 Fuhrmann
4,107,800 A 8/1978 Jorgensen
4,202,557 A 5/1980 Haussmann et al.
4,353,670 A 10/1982 Jorgensen
4,551,875 A 11/1985 Getz et al.
4,573,839 A 3/1986 Finnegan
4,605,348 A 8/1986 DeCaro
4,676,703 A 6/1987 Swanson
4,692,073 A 9/1987 Martindell
4,736,658 A 4/1988 Jore
4,852,196 A 8/1989 Martin
4,900,202 A 2/1990 Wienhold
4,954,025 A 9/1990 Crawford et al.
4,976,173 A 12/1990 Yang
5,013,194 A 5/1991 Wienhold
5,029,498 A 7/1991 Kinsey
5,038,435 A 8/1991 Crawford et al.
5,097,555 A 3/1992 Dwyer
5,129,118 A 7/1992 Walmesley (List continued on next page.)

FOREIGN PATENT DOCUMENTS

JP 2-100807 A 4/1990
WO WO 98/51450 11/1998

*Primary Examiner*—Daniel W. Howell
(74) *Attorney, Agent, or Firm*—Maginot Moore & Beck

(57) ABSTRACT

A drill and drive apparatus includes a tube assembly which defines a tool chamber. The apparatus further includes a tool holder which is configured to be at least partially received in the tool chamber of the tube assembly. The tool holder includes a holder body defining a first tool recess and having (i) a first section with a first width and at least one ball aperture communicating with the first tool recess, and (ii) a second section with a second width less than the first width. The tool holder further includes a first tool locking mechanism at a first end portion thereof. The first tool locking mechanism includes (i) a tool locking collar positioned around the holder body and positionable between a tool lock position and a tool release position, (ii) at least one ball positioned with the at least one ball aperture, wherein the at least one ball extends into the first tool recess when the tool locking collar is positioned in the tool lock position, and the at least one ball can be located away from the first tool recess when the tool locking collar is positioned in the tool release position, and (iii) a tool spring, positioned around the second section of the holder body, which biases the tool locking collar toward the tool lock position.

23 Claims, 11 Drawing Sheets

U.S. PATENT DOCUMENTS

| | | | | | |
|---|---|---|---|---|---|
| 5,309,799 | A | | 5/1994 | Jore | |
| 5,417,527 | A | | 5/1995 | Wienhold | |
| 5,470,180 | A | | 11/1995 | Jore | |
| D365,113 | S | | 12/1995 | Ronan | |
| 5,586,847 | A | | 12/1996 | Mattern, Jr. et al. | |
| 5,651,647 | A | | 7/1997 | Ray | |
| D394,865 | S | | 6/1998 | Ronan | |
| 5,779,404 | A | | 7/1998 | Jore | |
| 5,806,381 | A | | 9/1998 | Lin | |
| 5,934,384 | A | * | 8/1999 | Wang | 279/75 |
| 5,954,463 | A | | 9/1999 | Jore | |
| 5,975,815 | A | | 11/1999 | Zierpka et al. | |
| 6,176,654 | B1 | | 1/2001 | Jore | |
| 6,241,434 | B1 | | 6/2001 | Ajimi | |
| 6,302,408 | B1 | | 10/2001 | Zierpka | |
| 6,325,393 | B1 | | 12/2001 | Chen et al. | |
| 6,347,914 | B1 | | 2/2002 | Boyle et al. | |
| 6,488,452 | B1 | * | 12/2002 | Hoskins et al. | 279/14 |

* cited by examiner

DRILL AND DRIVE APPARATUS WITH IMPROVED TOOL HOLDER

CROSS REFERENCE

Cross reference is made to U.S. patent application Ser. No. 09/630,989, entitled "Drill and Drive Apparatus Having Arrangement to Accommodate Long Drill Bits", filed on Aug. 2, 2000, now U.S. Pat. No. 6,488,452 in the name of Todd A. Hoskins, et al. The disclosure of the drill and drive apparatus in this application Ser. No. 09/630,989 is incorporated herein by reference.

BACKGROUND OF THE INVENTION

The present invention relates generally to a drill and drive apparatus, and more particularly to a drill and drive apparatus having an improved tool holder.

Throughout the years, various devices have been designed which allow an individual operating an electric drill to quickly change the tool being driven by the drill for another tool. For example, U.S. Pat. No. 4,573,839 (issued to Finnegan), discloses a drill and drive apparatus having a hollow main body portion which is adapted to receive a generally tube-shaped tool holder therein. The main body portion includes a shank which extends from the main body portion. The shank is secured to a chuck of the drill during use thereof. The tool holder is configured to releasably lock a drill bit within one of its ends using an alien screw, and lock a screwdriver bit within the other of its ends using another alien screw. The apparatus further includes a locking mechanism which operates to releasably lock the tool holder to the main body portion. During operation of the Finnegan apparatus, the tool holder may be secured partially within the main body portion while exposing the drill bit. Thereafter, the user may operate the apparatus to drill a hole in a workpiece. Then, the user may quickly release the tool holder from the main body portion, and rotate the tool holder 180°. Thereafter, the user may insert the rotated tool holder into the main body portion and then relock the tool holder thereto with the screwdriver bit exposed. Then, the user may place the tip of a threaded side of a screw in the hole located in the workpiece, and drive the screw into the workpiece with the drill and drive apparatus and the drill.

One drawback with the above-described drill and drive device is that changing the drill bit and/or the screwdriver bit by loosening and tightening the alien screws is a time consuming and cumbersome process. Consequently, other devices have been designed that include a quick connect locking mechanism which operates to releasably lock the drill bit and the screwdriver bit to the tool holder. For example, it is known to provide a locking mechanism for a tool holder of a chuck device wherein the locking mechanism includes a sliding sleeve disposed on the outside of the tool holder and releasably holding a ball in an annular retaining groove of a tool. The tool can be unlocked by sliding the sleeve relative to the remainder of the drive and drive apparatus in order to release the ball from the groove. After the tool is removed, a replacement tool can then be inserted, and the replacement tool is locked therein by sliding the sleeve back to its locked position to push the ball back into the groove of the replacement tool.

A drawback with quick connect designs of the above-described type is that the sliding sleeve that releasably holds the ball in the annular retaining groove is disposed on the outside of the tool holder, and thus adds to the outer diameter of the tool holder. It is advantageous for a tool holder to have a small diameter so that the tool holder can be inserted into narrow cavities. If the outer diameter of the tool holder is too large, it may prevent the tool holder from being inserted into narrow spaces in which it is desired to drill a screw hole, for example. From a structural integrity viewpoint, it is desirable for the walls of the tool holder to be as thick as possible in order to withstand the stresses resulting from the torquing of the tool during operation. However, from a functional viewpoint, it is desirable for the tool holder to be as thin as possible so that it can be inserted into narrow passageways to drill holes therein. For example, it may be desired to drill a screw hole at the bottom of a cylindrical cavity in a workpiece. If the diameter of the cavity is less than the diameter of the tool holder, then the tool holder cannot progress in the axial direction past the point where the tool holder contacts the workpiece at the top of the cavity. Since the drill bit is attached to the tool holder, the axial progression of the drill bit is also stopped once the tool holder has contacted the workpiece at the top of the cavity. Thus, it may not be possible for the drill bit held by the tool holder to reach the bottom of the cavity in order to drill a screw hole, or it may not be possible to drill the screw hole as deeply as desired.

What is needed therefore is a drill and drive assembly which overcomes one or more drawbacks of the previously designed devices. For example, what is needed is a drill and drive apparatus in which the drill bit and/or screwdriver bit can be quickly and easily removed from and replaced in the tool holder. Moreover, there is a need for a tool holder for a drill and drive apparatus that has a diameter small enough that the tool holder can be inserted into relatively narrow openings.

SUMMARY OF THE INVENTION

In accordance with one embodiment of the present invention, there is provided a drill and drive apparatus that includes a tube assembly which defines a tool chamber. The apparatus further includes a tool holder which is configured to be at least partially received in the tool chamber of the tube assembly. The tool holder includes a holder body defining a first tool recess and having (i) a first section with a first width and at least one ball aperture communicating with the first tool recess, and (ii) a second section with a second width less than the first width. The tool holder further includes a first tool locking mechanism at a first end portion thereof. The first tool locking mechanism includes (i) a tool locking collar positioned around the holder body and positionable between a tool lock position and a tool release position, (ii) at least one ball positioned with the at least one ball aperture, wherein the at least one ball extends into the first tool recess when the tool locking collar is positioned in the tool lock position, and the at least one ball can be located away from the first tool recess when the tool locking collar is positioned in the tool release position, and (iii) a tool spring, positioned around the second section of the holder body, which biases the tool locking collar toward the tool lock position.

Pursuant to another embodiment of the present invention, there is provided a tool holder for a drill and drive apparatus. The tool holder includes a holder body defining a first tool recess and having (i) a first section with a first width and at least one ball aperture communicating with the first tool recess, and (ii) a second section with a second width less than said first width. The tool holder further includes a first tool locking mechanism at a first end portion thereof, the first tool locking mechanism having a tool locking collar positioned around the holder body and positionable between a tool lock position and a tool release position, the tool locking collar including a back-up ring attached at an end thereof. The first tool locking mechanism also has at least one ball positioned within the at least one ball aperture, wherein the at least one ball extends into the first tool recess when the tool locking collar is positioned in the tool lock position, and the at least one ball is locatable away from the first tool recess when the tool locking collar is positioned in the tool release position. The first tool locking mechanism further has a tool spring, positioned around the second section of the holder body, which exerts force upon the back-up ring to thereby bias the tool locking collar toward the tool lock position.

According to still another embodiment of the present invention, there is provided a tool holder for a drill and drive apparatus. The tool holder includes a holder body defining a first tool recess and having (i) a first section with a first width and at least one ball aperture communicating with the first tool recess, and (ii) a second section with a second width less than said first width. The tool holder also includes a first tool locking mechanism at a first end portion thereof, the first tool locking mechanism having a tool locking collar positioned around the holder body and positionable between a tool lock position and a tool release position. The first tool locking mechanism also has at least one ball positioned within the at least one ball aperture, wherein the at least one ball extends into the first tool recess when the tool locking collar is positioned in the tool lock position, and the at least one ball can be located away from the first tool recess when the tool locking collar is positioned in the tool release position. The first tool locking mechanism further has a tool spring, positioned around the second section of the holder body, which biases the tool locking collar toward the tool lock position. The tool holder further includes a second tool locking mechanism at a second end portion thereof.

In another aspect of the invention, a tool holder for a drill and drive apparatus comprises a holder body defining a first tool recess open at a first end of the body to receive a tool therein. The holder body further includes (i) a first section adjacent the first end with a first outer dimension and at least one ball aperture extending therethrough in communication with the first tool recess, and (ii) a second section adjacent the first section and with a second outer dimension less than the first outer dimension. The apparatus further includes a first tool locking mechanism at the first end that includes a tool locking collar disposed around the first and second sections of the holder body. Together with the holder body the locking collar defines an annular chamber. The tool locking collar is slidable along the holder body between a tool lock position and a tool release position in which the annular chamber is disposed about the at least one ball aperture. The first tool locking mechanism further includes at least one ball disposed within theat least one ball aperture and movable within the aperture between a position extending into the first tool recess when the tool locking collar is positioned in the tool lock position, and a position located away from the first tool recess when the tool locking collar is in the tool release position. A biasing mechanism is disposed within the annular chamber that is operable to bias the tool locking collar toward the tool lock position.

It is one object of the present invention to provide an improved drill and drive apparatus. It is yet another object of the invention to provide a drill and drive apparatus in which a drill bit and/or a screwdriver bit can be quickly and easily removed from and replaced in a tool holder.

Yet another object is to provide a tool holder for a drill and drive apparatus that has a diameter small enough that the tool holder can be inserted into a relatively narrow space. Thus, the tool holder can be used to form pilot holes within cavities that are so narrow that it would not be possible to insert thicker tool holders into the cavities. Other objects and benefits of the present invention can be discerned from the following description and accompanying drawings.

DESCRIPTION OF THE PREFERRED EMBODIMENT

Figure 1:
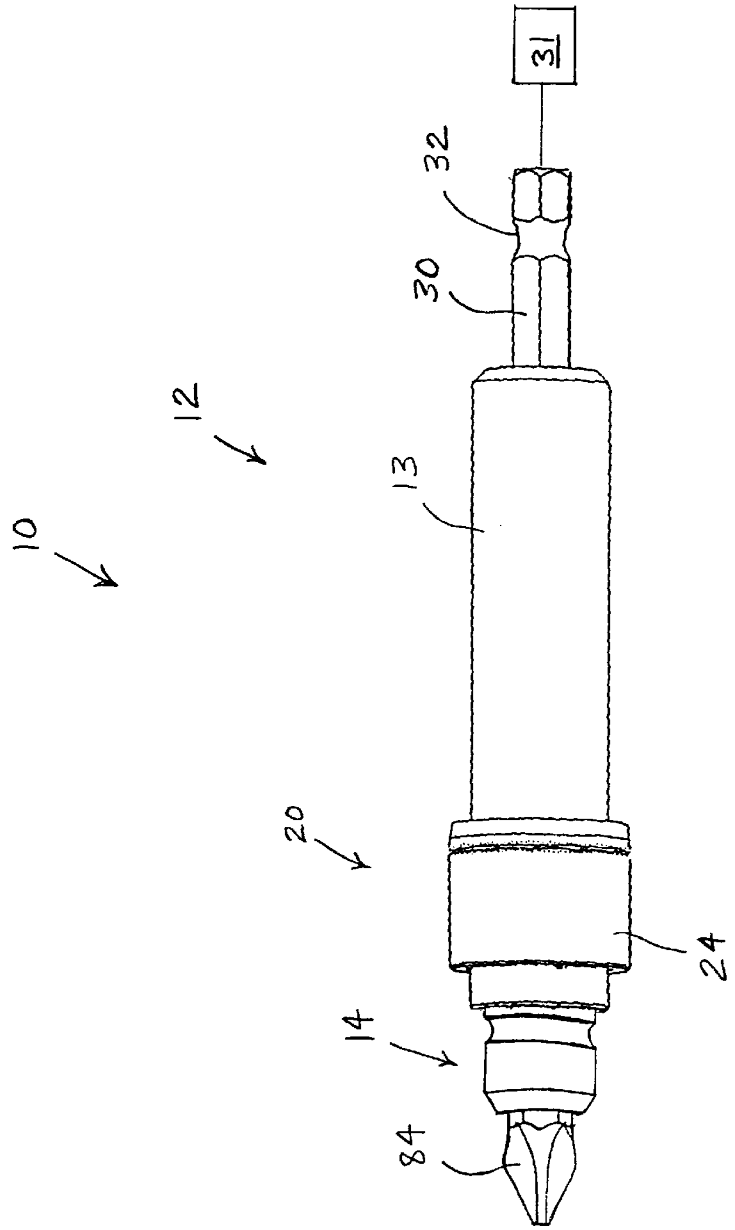
FIG. 1 is an elevational view of the drill and drive apparatus which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
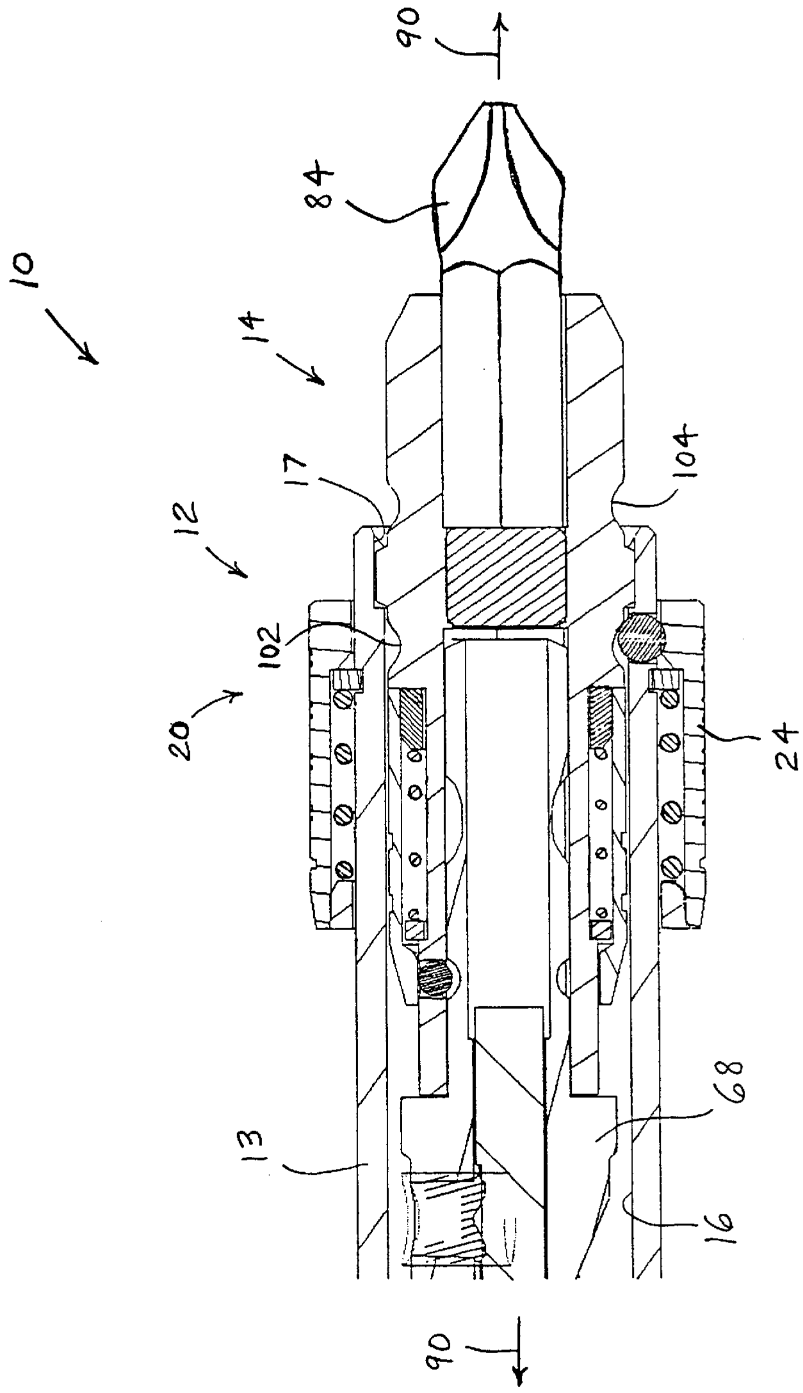
FIG. 2 is a fragmentary cross-sectional view of the drill and drive apparatus of FIG. 1.
Figure 3:
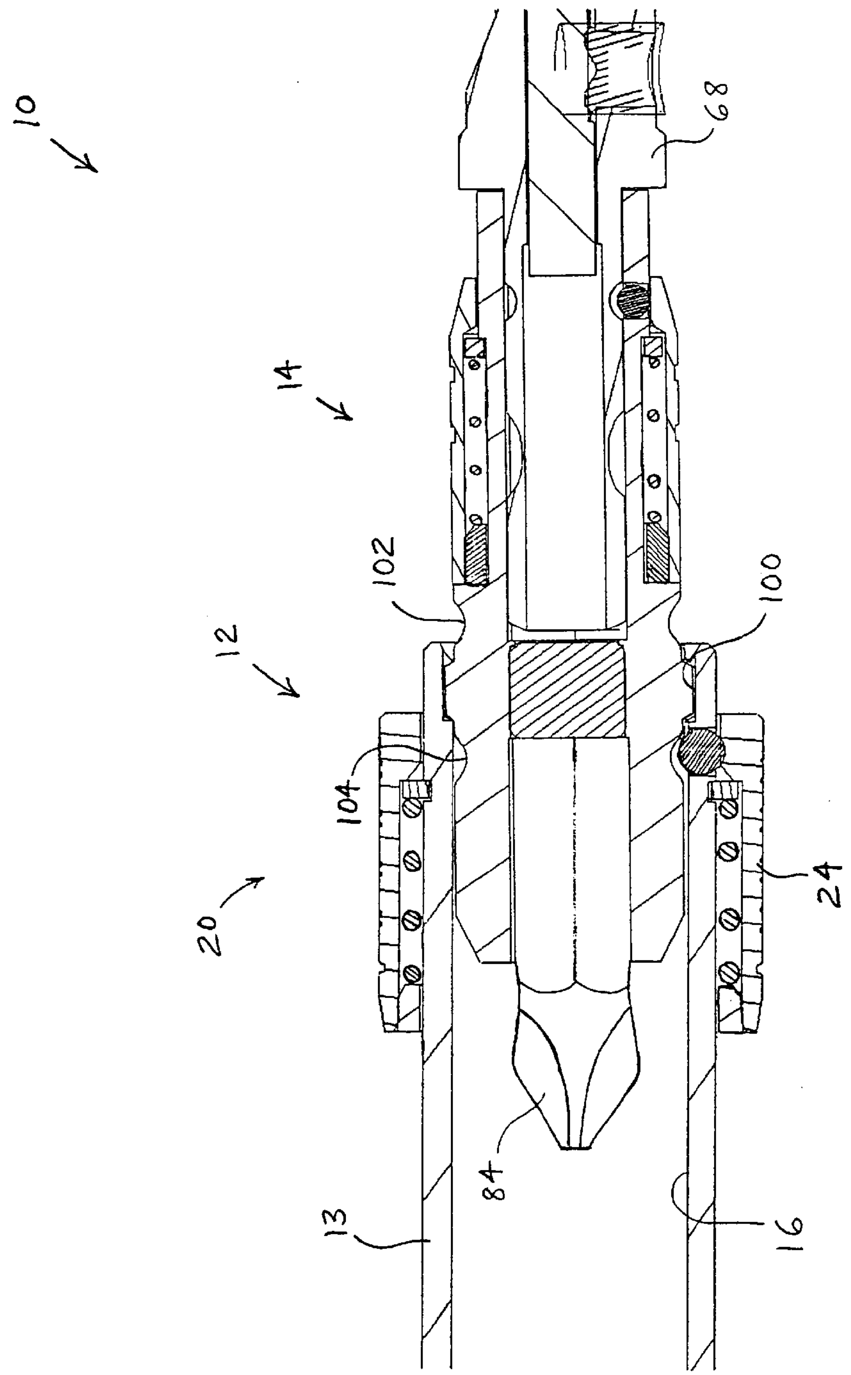
FIG. 3 is a view similar to FIG. 2, but showing the tool holder rotated 180° relative to its position depicted in FIG. 2.

Referring now to FIG. 1, there is shown a drill and drive apparatus 10 which incorporates the features of the present invention therein. The drill and drive apparatus 10 includes a tube assembly 12 and a tool holder 14 for holding a tool, such as screwdriver bit 84. The tube assembly 12 includes a tube body 13, a tube locking mechanism 20 and a shank 30. Shank 30 is adapted to be received into a chuck of an electric drill which is schematically shown by the reference number 31. Tube body 13 has a tool chamber 16 (FIG. 2) defined therein, and includes a tool side opening 17 which allows access to the tool chamber 16. The tool holder 14 is partially received within the tool chamber 16 by advancement of the tool holder through the tool-side opening 17 as shown in FIGS. 2–3.

Figure 4:
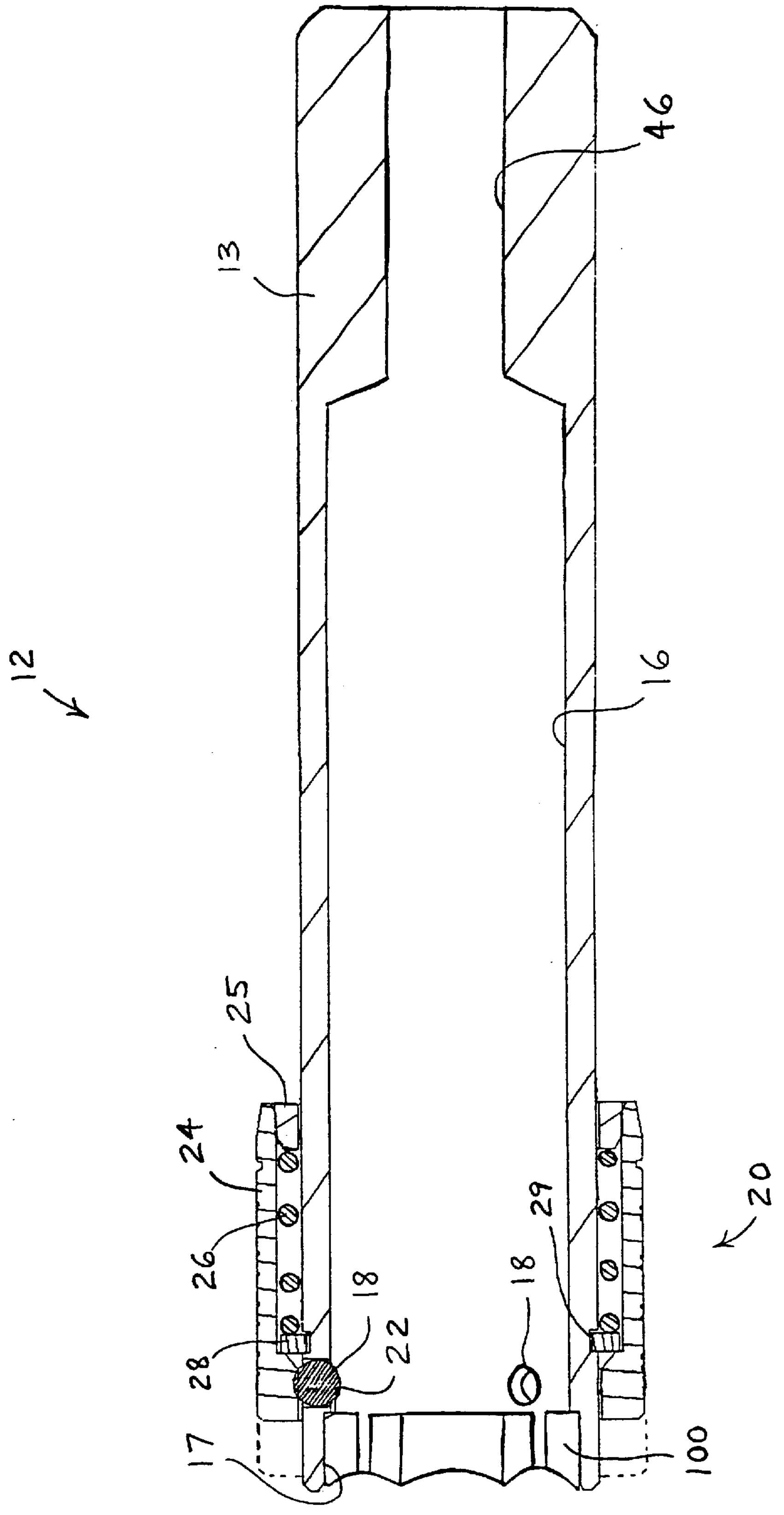
FIG. 4 is an enlarged cross sectional view of the tube body and tube locking mechanism of the tube assembly of the drill and drive apparatus of FIG. 1.

The tube body 13 can define a number of ball apertures 18 therein, two of which are-visible in FIG. 4. In one embodiment, three such apertures 18 are uniformly disposed around the outer diameter of the tube body. The ball apertures 18 communicate with the tool chamber 16 as shown in FIG. 4. More specifically, the ball apertures 18 extend entirely through a wall of the tube body 13 so as to create a communicating passage between the tool chamber 16 and the outside of the tube body 13. The ball apertures 18 are configured at their ends adjacent to the tool chamber 16 to be narrower than the diameters of an associated ball 22 so as to prevent the ball 22 from advancing into the tool chamber 16.

The tube locking mechanism 20, which is shown in detail in FIG. 4, is configured to releasably lock the tool holder 14 to the tube assembly 12 when the tool holder 14 is received within the tool chamber 16 of the tube assembly 12. The tube locking mechanism 20 includes the balls 22 which are positioned within the ball apertures 18 as shown in FIG. 4. The tube locking mechanism 20 further includes a tube locking collar 24 which is positioned around the tube body 13. The tube locking collar 24 includes a ring member 25 attached at an end thereof. Moreover, the tube locking mechanism 20 includes a tube spring 26 which is interposed between the tube body 13 and the tube locking collar 24. The tube spring 26 is retained between the ring member 25 and a split ring 28 seated in an annular groove 29 of the tube body 13 as shown in FIG. 4.

Figure 9:
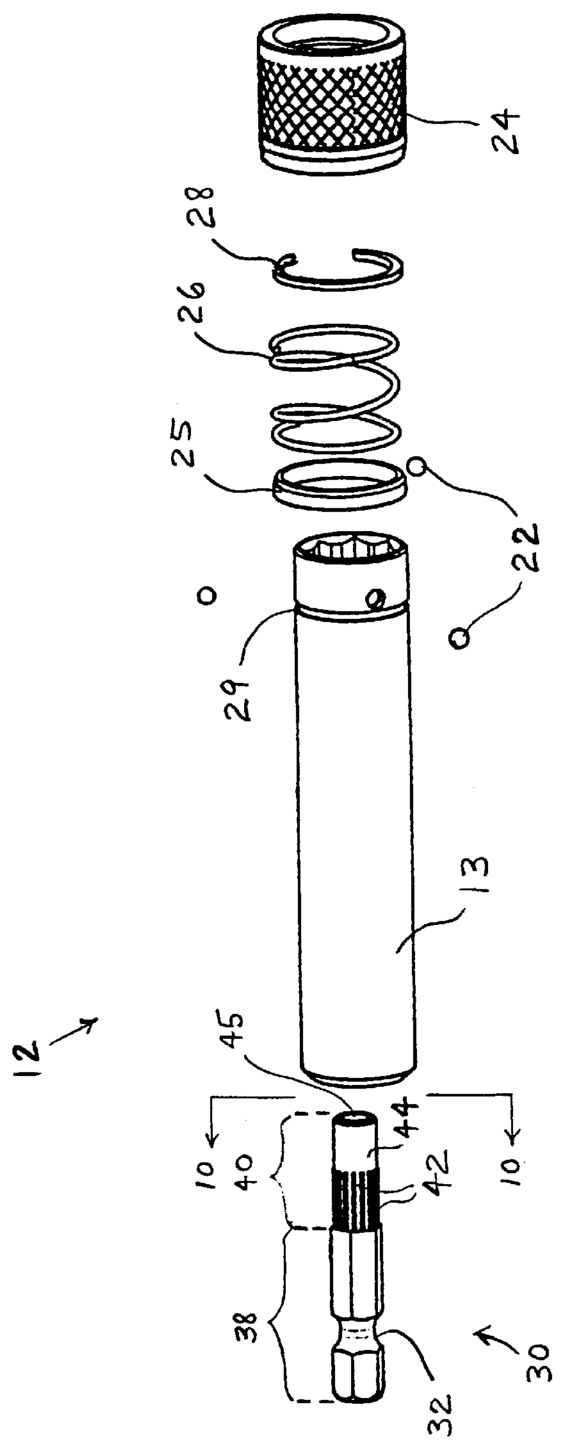
FIG. 9 is an exploded perspective view of the tube assembly of the drill and drive apparatus of FIG. 1.

The shank 30 includes a locking groove 32 which allows shank 30 to be locked into a locking mechanism similar to tube locking mechanism 20. The shank 30 is made up of a chuck segment 38 and an attachment segment 40 as shown in FIG. 9. The chuck segment 38 preferably has a non-circular shape, such as a polygonal shape which is most preferably hexagonal. The attachment segment 40 is friction fit into a drill-side passage 46 defined in the tube body 13 as shown in FIG. 4. The attachment segment 40 can include a number of splines 42 which extend outwardly from a base portion 44 of the attachment segment 40 to facilitate the friction fit. During operation of the drill and drive apparatus 10, rotation of the chuck segment 38 by the electric drill 31 causes rotation of the tube body 13. Note that the chuck segment 38 is located outside of the tube body 13 so that, during operation of the drill and drive apparatus 10, the chuck segment is received into the chuck of the drill 31. The base portion 44 can define a bore 45, extending at least partially therein, that can be sized to receive a drill bit 68 (FIG. 5) stowed within the tool chamber 16.

Figure 6:
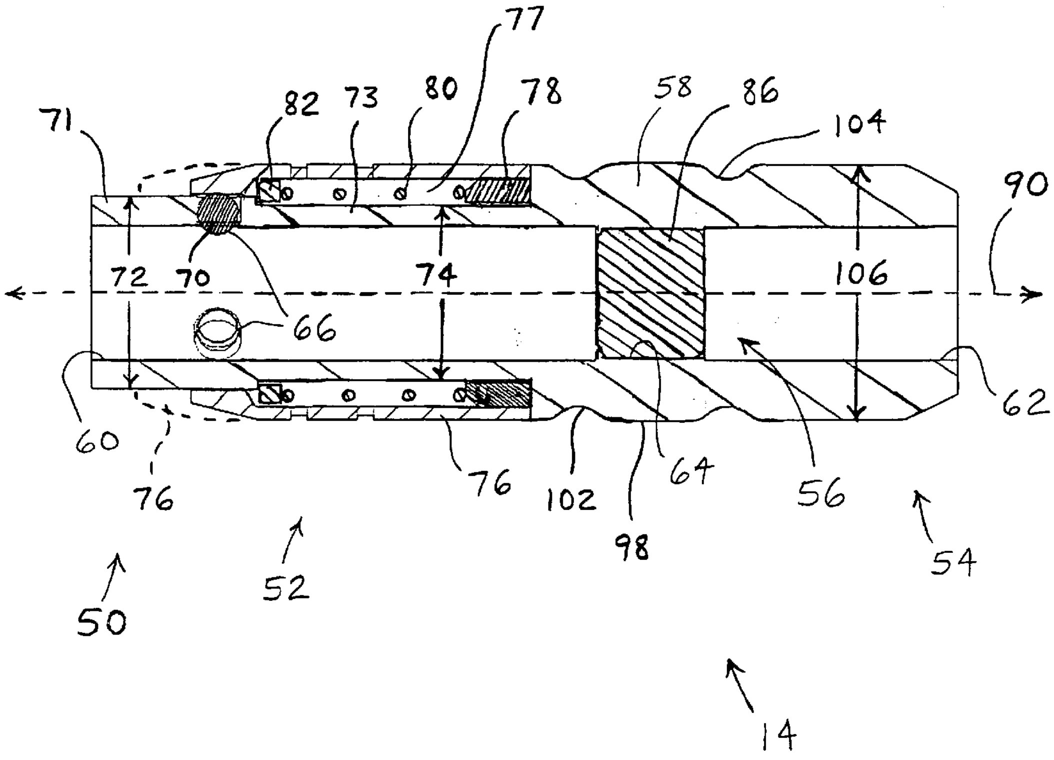
FIG. 6 is an enlarged cross sectional view of the tool holder of the drill and drive apparatus of FIG. 1.
Figure 8:
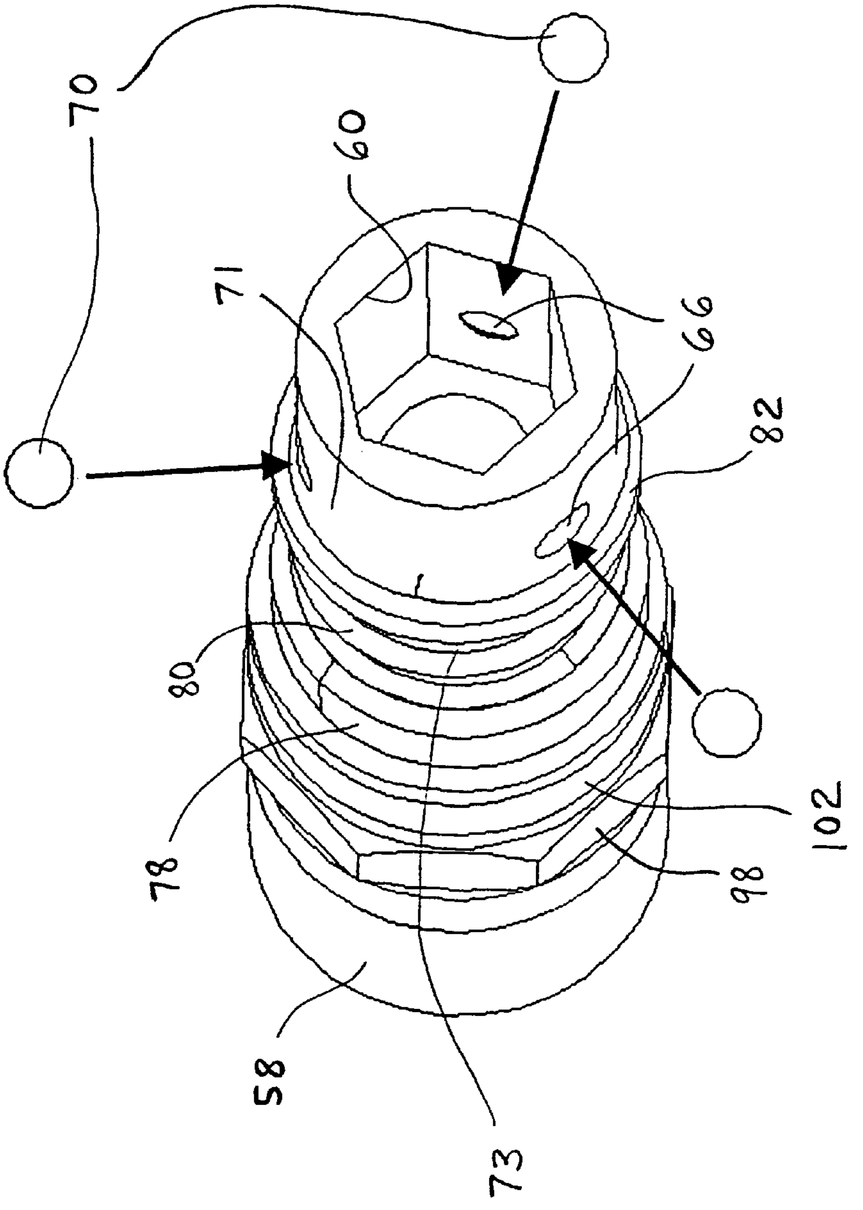
FIG. 8 is a perspective view of the holder body, back-up ring, tool spring, split ring and balls of the tool holder of the drill and drive apparatus of FIG. 1.

As shown in FIG. 6, the tool holder 14 includes a first end portion 50 having a first tool locking mechanism 52, and a second end portion 54 having a second tool locking mechanism 56. The tool holder 14 further includes a holder body 58 having a first tool recess 60 and a second tool recess 62 defined therein. The holder body 58 can further include a magnet recess 64 defined therein. In addition, the holder body 58 further has a number of ball apertures 66 defined therein, two of which are visible in FIG. 6, which communicate with the first tool recess 60. More specifically, the ball apertures 66 extend entirely through a wall of the holder body 58 so as to create a number, preferably three, of communicating passages between the first tool recess 60 and the outside of the holder body 58, as shown in FIG. 8. The ball apertures 66 are configured at their ends adjacent to the first tool recess 60 to be narrower than the diameters of three associated balls 70 so as to prevent the balls 70 from advancing into the first tool recess 60. The ball apertures 66 are disposed in a first section 71 of holder body 58 having a width or diameter 72. Axially adjacent to the first section 71 is a second section 73 of holder body 58 having a width or diameter 74 that is smaller than diameter 72. Second section 73 is disposed between first section 71 and second end portion 54 of tool holder 14.

Figure 7:
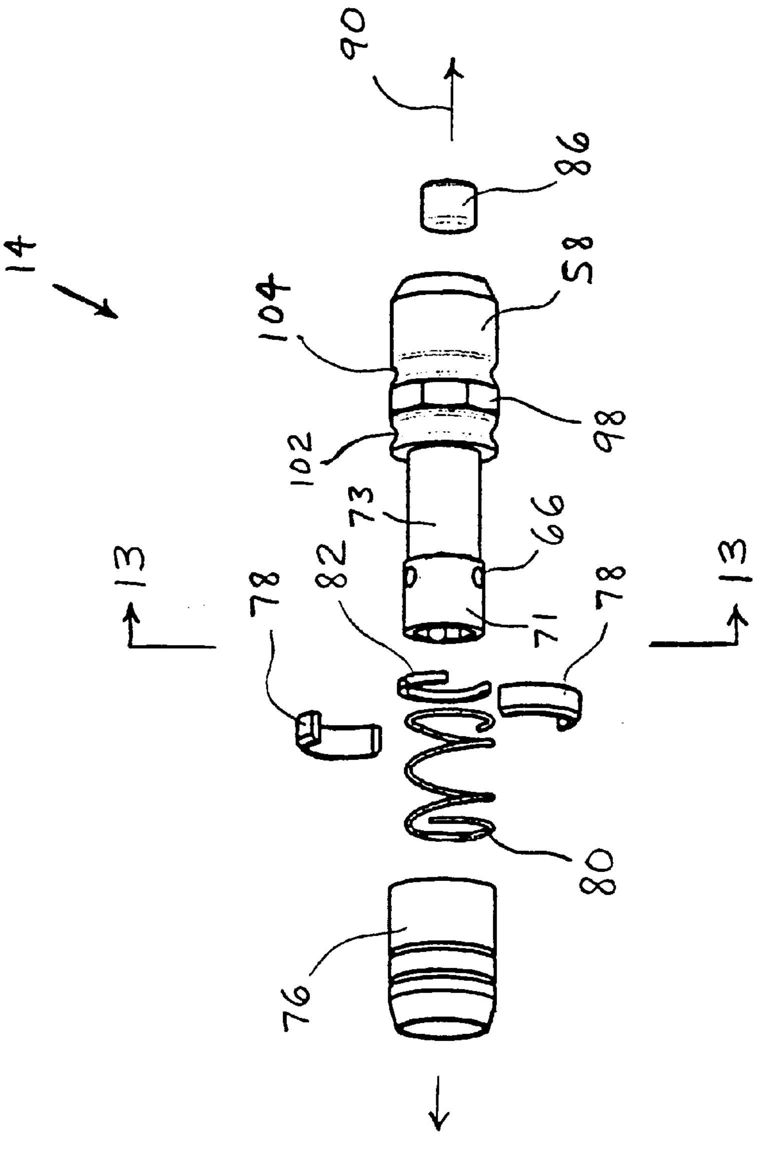
FIG. 7 is an exploded perspective view of the tool holder of the drill and drive apparatus of FIG. 1.

The first tool locking mechanism 52 is configured to releasably lock a drill bit 68 to the tool holder 14 when the drill bit 68 is received within the first tool recess 60 of the tool holder 14. The first tool locking mechanism 52 includes the balls 70 which are positioned within the ball apertures 66 as shown in FIG. 6. The first tool locking mechanism 52 further includes a tool locking collar 76 which is positioned around the holder body 58. The tool locking collar 76 cooperates with the second section 73 of the holder body to define an annular chamber 77 therebetween. A biasing mechanism is disposed within the annular chamber 77 to bias the tool locking collar to its locking position. The biasing mechanism includes a back-up ring 78 attached at an end of the locking collar 76. Preferably, the outside surface of back-up ring 78 is attached to the inside surface of tool locking collar 76 via an interference fit. As shown in FIG. 7, back-up ring 78 can be split into two parts in an axial direction as defined by an axis of rotation 90 of the tool holder 14. More specifically, back-up ring 78 is bisected in the direction of axis 90 into two half-rings of equal size.

Figure 12:
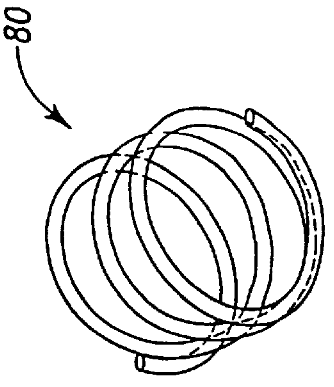
FIG. 12 is a perspective view of the tool spring of the first tool locking mechanism of the drill and drive apparatus of FIG. 1.
Figure 11:
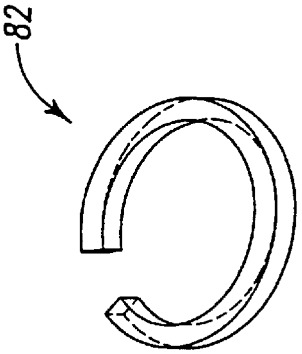
FIG. 11 is a perspective view of the split ring of the first tool locking mechanism of the drill and drive apparatus of FIG. 1.
Figure 10:
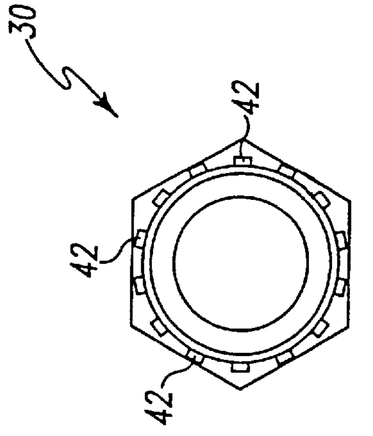
FIG. 10 is an end elevational view of the shank of the tube assembly of the drill and drive apparatus of FIG. 1 as taken along the lines 10—10 of FIG. 9.

Moreover, the first tool locking mechanism 52 further includes a tool spring 80 (see also FIG. 12) interposed between the holder body 58 and the tool locking collar 76, and disposed within the annular chamber 77. The first tool locking mechanism 52 additionally includes a split ring 82 (see FIG. 11) which, like backup ring 78 and tool spring 80, is positioned around the second section 73 of holder body 58 and within the chamber 77. The tool spring 80 is retained between the back-up spring 78 and the split ring 82 within tool locking collar 76 as shown in FIG. 6.

The second tool locking mechanism 56 is configured to releasably lock a metallic screwdriver bit 84 (FIGS. 5 and 6) to the tool holder 14. The second tool locking mechanism 56 can include a magnet 86 which is located in the magnet recess 64 of the holder body 58. The magnet 86 is comprised of a conventional magnetic material which is effective to attract and hold a metallic tool component within the second tool recess 62.

The tool holder 14 further includes a non-circular, preferably polygon shaped exterior drive surface 98 which is most preferably octagonally shaped. Conversely, the tube body 13 defines a polygonally shaped interior drive surface 100 which is located within the tool chamber 16 (see FIGS. 3 and 4). The interior drive surface 100 cooperates with the exterior drive surface 98 when the tool holder 14 is locked to the tube assembly 12 such that rotation of the tube assembly 12 during operation of the drill and drive apparatus 10 causes rotation of the tool holder 14.

Figure 5:
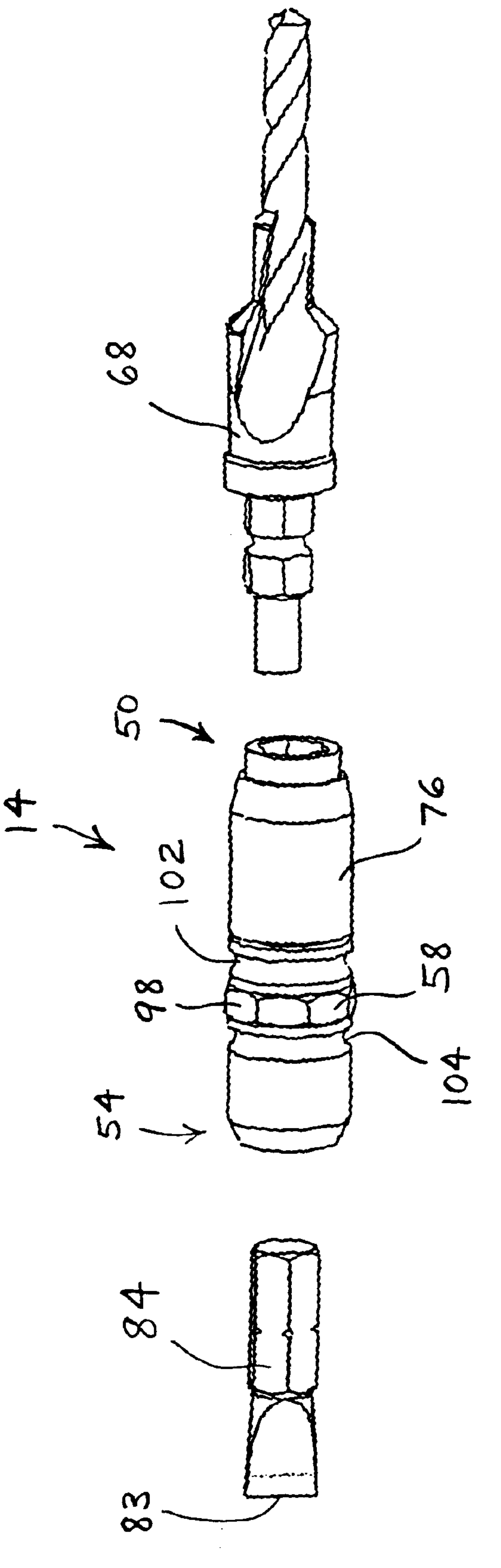
FIG. 5 is an exploded perspective view of the tool holder of the drill and drive apparatus of FIG. 1, the drill bit of FIG. 1, and a screwdriver bit adapted to be used therewith.

The tool holder 14 further includes a first locking groove 102 defined therein. The first locking groove 102 is located on a first side of the exterior drive surface 98 as shown in FIGS. 5 and 6. The tool holder 14 also includes a second locking groove 104 defined therein. The second locking groove 104 is located on a second side of the exterior drive surface 98 as shown in FIGS. 5 and 6.

In order to maximize the structural integrity of the tool holder 14, it is generally desirable to maximize the wall thickness of the holder body 58 in regions having ball apertures 66 defined therein. However, in conflict with this objective, it is also desirable to minimize the wall thickness of the holder body 58 in regions surrounded by the back-up ring 78, the tool spring 80 and the split ring 82. It is desirable to minimize the wall thickness of the holder body 58 in these regions so that the external diameter of the tool locking collar 76, which is positioned around the tool holder body 58, can also be minimized.

More particularly, it can be readily ascertained from FIG. 6 that a maximum outer diameter 106 of tool locking collar 76 is dependent upon the diameter 74 of second section 73, and not upon the diameter 72 of first section 71. As alluded to above, it is desirable to maximize the wall thickness of first section 71 in order to accommodate balls 66 of a desired diameter and to maximize the structural integrity of first section 71. To this end, by configuring diameter 74 to be less than diameter 72, it is possible to minimize the outer diameter 106 of tool locking collar 76 while maintaining a desired wall thickness of first section 71. The advantage of minimizing the external diameter 106 of the tool locking collar 76 is that the tool holder 14 can then be physically placed into and operated within narrow openings.

Figure 13:
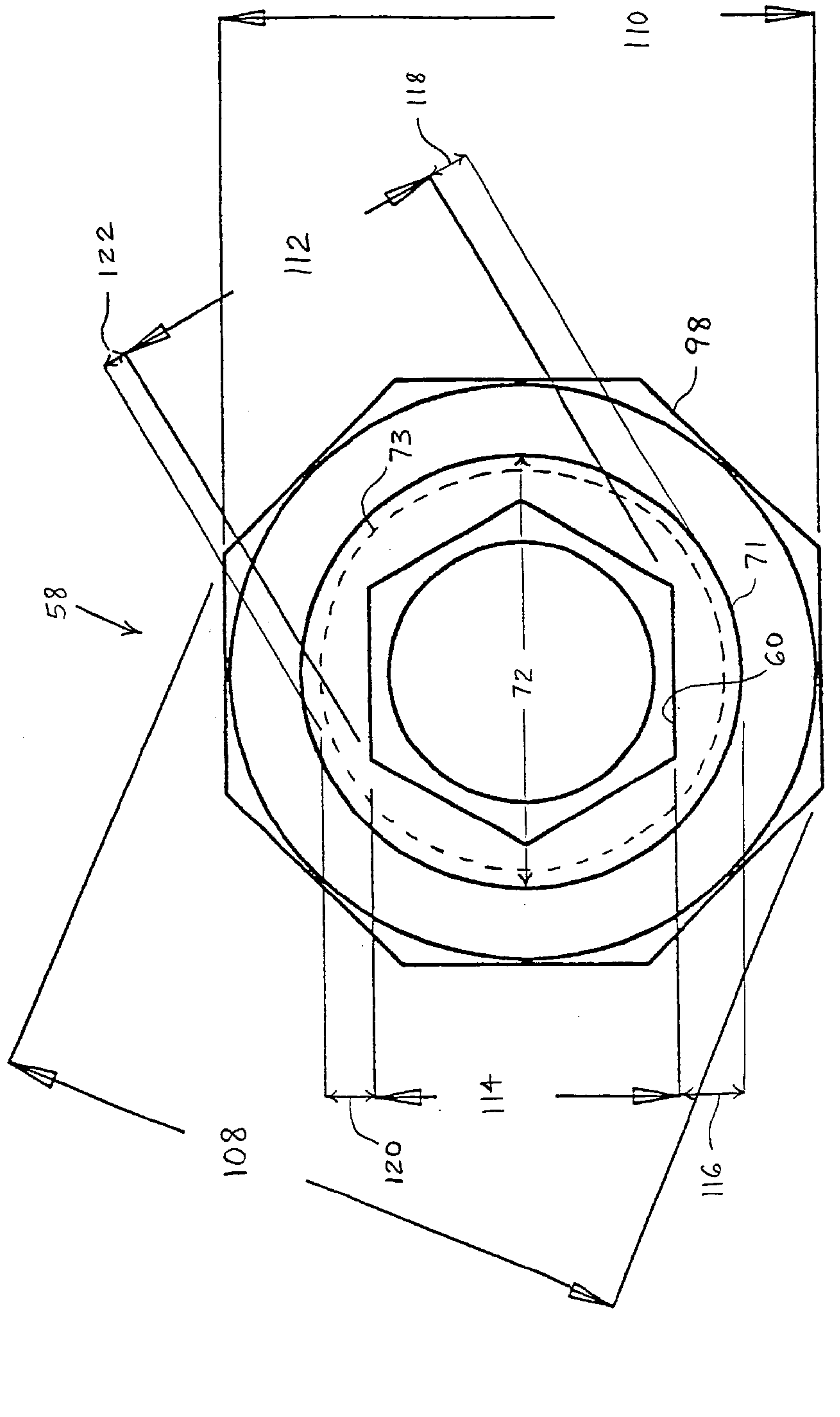
FIG. 13 is an enlarged, end elevation view of the holder body of the tool holder of the drill and drive apparatus of FIG. 1 as taken along the lines 13—13 of FIG. 7.

FIG. 13 shows various dimensions of the holder body 58 in a preferred embodiment. More particularly, FIG. 13 shows inner diameters, outer diameters and wall thicknesses of first section 71, second section 73 and drive surface exterior 98 of holder body 58. In one embodiment, the outer diameter 72 of first section 71 is 0.366 inch, while the outer diameter 74 of the second section 73 (FIG. 6) is 0.331 inch. The inner diameters of back-up ring 78 and split ring 82 (FIG. 6), are both preferably about 0.343 inches to provide running clearance around diameter 74 of the second section 73 but still be retained against the larger diameter 72 of the first section 71. The outer diameter 106 of tool locking collar 76 (FIG. 6) is approximately 0.486 inch, while the exterior drive surface 98 can have a maximum width 108 (FIG. 13) of 0.527 inch and a minimum width 110 of 0.492 inch. Again, in one embodiment, the first tool recess 60 can have a maximum width 112 of 0.284 inch and a minimum width 114 of 0.253 inch.

The wall of the first section 71 can have a maximum thickness 116 of 0.0565 inch ((0.366−0.253)/2) and a minimum thickness 118 of 0.041 inch ((0.366−0.284)/2), as measured relative to the tool recess width. In addition, the wall of the second section 73 can have a maximum thickness 120 of 0.039 inch ((0.331−0.253)/2) and a minimum thickness 122 of 0.0235 inch ((0.331−0.284)/2), again as measured relative to the toll recess width.

It can be appreciated from the foregoing dimensions that the present invention preserves the structural integrity of the tool holder 14, particularly at the locking regions of the holder body 58. The wall thicknesses 120 and 122 at the second section are sufficient to withstand normal loading. At the same time, the present invention permits the outer diameter to be reduced from prior tool holders. In particular, the reduced diameter 74 ultimately results in a reduced diameter 106 for the locking collar 76.

It should be understood that this specific embodiment is to be considered as illustrative and not restrictive in character. Thus, those of ordinary skill in the art may readily modify any and all of the above dimensions and fall within the spirit and scope of the present invention as defined by the appended claims.

Operation of the Drill and Drive Apparatus 10

While the tool holder 14 is separated from the tube assembly 12, the user inserts the drill bit 68 into the first tool recess 60 while urging the tool locking collar 76 against the spring bias of the tool spring 80 to move the tool locking collar from a tool lock position (shown in solid lines in FIG. 6) to a tool release position (shown in phantom lines in FIG. 6). Thereafter, the user releases the tool locking collar 76 so as to allow the tool locking collar 76 to return to the tool lock position thereby locking the drill bit 68 to the tool holder 14. Then, the user inserts the screwdriver bit 84 into the second tool recess 62 so as to lock the screwdriver bit to the tool holder 14.

It should be appreciated that when the tool locking collar 76 is positioned in its tool lock position, the tool locking collar 76 is positioned in contact with the balls 70, and the balls 70 are caused to extend into the first tool recess 60. Note that when the tool locking collar 76 possess the orientation as shown in solid lines in FIG. 6, the balls 70 are positioned in the first tool recess 60 and also in a groove defined in a base of the drill bit 68 thereby locking the drill bit 68 to the tool holder 14. Also note that when the tool locking collar 76 possesses the orientation as shown in phantom lines in FIG. 6, the balls 70 can be located away from the first tool recess 60 and also can be located away from the groove defined in the base of the drill bit 68 thereby releasing the drill bit 68 from the tool holder 14. In this position, the annular recess 77 of the locking collar 76 is disposed over the apertures 66 and balls 70 so that the balls can be moved aside by passage of a tool into the tool holder 14.

Thereafter, the user inserts the tool holder 14 into the tube assembly 12 so that the screwdriver bit 84 is advanced into the tool chamber 16, i.e., tool holder 14 is oriented as shown in FIG. 3. Then, the user operates the tube locking mechanism 20 so as to enable the tool holder 14 to be locked to the tube assembly 12. In particular, the user urges the tube locking collar 24 against the spring bias of the tube spring 26 so as to move the tube locking collar 24 from a tube lock position (shown in solid lines in FIG. 4) to a tube release position (shown in phantom lines in FIG. 4). After the tool holder is partially located in the tube assembly 12 as shown in FIG. 3, the user releases the tube locking collar 24 so as to lock the tool holder 14 to the tube assembly 12.

Assembly of the drill and drive apparatus 10 has been described herein such that the drill bit 68 is first placed into the tool holder 14, and then the tool holder 14 is placed into the tube assembly 12. However, it is to be understood that this order of events is arbitrary, and it is equally possible to place the drill bit 68 into the tool holder 14 after the tool holder 14 has already been placed into the tube assembly 12.

After the tube assembly 12, the tool holder 14 and the drill bit 68 have been assembled together as described above, the user then operates the drill 31 so as to rotate the tube assembly 12 and consequently the tool holder 14. As the tool holder 14 rotates, the drill bit 68 is caused to rotate. As the drill bit is rotating, the user advances the drill 31 and consequently the drill bit 68 into a workpiece so as to create a hole.

Thereafter, the user retracts the drill bit 68 from the hole and operates the tube locking mechanism 20 so as to unlock the tool holder 14 from the tube assembly 12. In particular, the user urges the tube locking collar 24 against the spring bias of the tube spring 26 so as to move the tube locking collar from the tube lock position (shown in solid lines in FIG. 4) to the tube release position (shown in phantom lines in FIG. 4). When the tube locking collar 24 is positioned in its tube lock position, the tube locking collar 24 is positioned in contact with the balls 22, and the balls 22 extend into the tool chamber 16. Note that when the tool holder 14 possesses the orientation as shown in FIG. 1, the balls 22 are positioned in the first locking groove 102 thereby locking the tool holder 14 to the tube assembly 12 with the screwdriver bit 84 exposed outside of the tool chamber 16. Also note that when the tool holder 14 possesses the orientation as shown in FIG. 2, the balls 22 are positioned in the second locking groove 104 thereby locking the tool holder 14 to the tube assembly 12 with the drill bit 68 exposed outside of the tool chamber 16.

Then, after the tool holder 14 is unlocked from the tube assembly 12, the user rotates the tool holder 180°. Thereafter, the user inserts the rotated tool holder 14 into the tube assembly 12 so that the drill bit 68 is advanced into the tool chamber 16 as shown in FIG. 1. The drill bit can also extend into the bore 45 in the base portion 44 of the attachment segment 40. Then, the user operates the tube locking mechanism 20 so as to cause the tool holder 14 to be locked to the tube assembly 12 as described above. Note that while the tool holder 14 is positioned in this orientation relative to the tube assembly 12, the screwdriver bit 84 is exposed for use.

The user then places the tip of a threaded side of a screw in the hole located in the workpiece. Thereafter, the user contacts the other end of the screw with an operative end 83 of the screwdriver bit 84. The user then operates the drill 31 to rotate the screw into the workpiece.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

There are a plurality of advantages of the present invention arising from the various features of the drill and drive apparatus described herein. It will be noted that alternative embodiments of the drill and drive apparatus of the present invention may not include all of the features described yet still benefit from at least some of the advantages of such features. Those of ordinary skill in the art may readily devise their own implementations of the drill and drive apparatus that incorporate one or more of the features of the present invention and fall within the spirit and scope of the present invention as defined by the appended claims. For example, while the first tool locking mechanism 52 and the second tool locking mechanism 56 have each been specifically described as being a particular type of locking mechanism and numerous advantages result therefrom, many advantages of the present invention may still be obtained if other types of locking mechanisms are used in the drill and drive apparatus 10 as the first locking mechanism 52 and/or the second locking mechanism 56.

What is claimed is:

1. A drill and drive apparatus, comprising:

a tube assembly defining a tool chamber; and a tool holder configured to be at least partially received within said tool chamber of said tube assembly, said tool holder including;

a holder body defining a first tool recess and having (i) a first section with a first maximum outer dimension and at least one first aperture extending therethrough, and (ii) a second section with a second maximum outer dimension less than said first maximum outer dimension, and a first tool locking mechanism having (i) a tool locking collar positioned around said holder body and positionable between a tool lock position and a tool release position, (ii) at least one first locking element movably extending through said at least one first aperture, said at least one first locking element movable from a position located away from said first tool recess when said tool locking collar is positioned in said tool release position, to a position extending into said first tool recess when said tool locking collar is positioned in said tool lock position, and (iii) a tool spring positioned adjacent said second section of said holder body and operable to bias said tool locking collar toward said tool lock position.

2. The drill and drive apparatus of claim 1, further comprising a tube locking mechanism configured to releasably lock said tool holder to said tube assembly when said tool holder is at least partially received within said tool chamber.

3. The drill and drive apparatus of claim 2, wherein:

said tube assembly includes a tube body defining a tool-side opening;

said tool holder extends through said tool-side opening when said tool holder is locked to said tube assembly; and said tube assembly and said tool holder define complementary surfaces that cooperate when said tool holder is locked to said tube assembly to transmit rotation therebetween.

4. The drill and drive apparatus of claim 2, wherein:

said tube assembly includes a tube body having at least one second aperture defined therein which communicates with said tool chamber; and said tube locking mechanism includes;

a tube locking collar positioned around said tube body and positionable between a tube lock position and a tube release position, at least one second locking element movably disposed within said at least one second aperture, said at least one second locking element movable from a position located away from said second tool recess when said tube locking collar is positioned in said tube release position, to a position extending into said second tool recess when said tube locking collar is positioned in said tube lock position, and a tube spring, positioned around said tube body, operable to bias said tube locking collar toward said tube lock position.

5. The drill and drive apparatus of claim 1, wherein:

said tool holder includes a second tool locking mechanism at a second end portion thereof, said holder body further defines a second tool recess and a magnet recess, and said second tool locking mechanism includes a magnet positioned within said magnet recess to generate a magnetic field within said second tool recess.

6. The drill and drive apparatus of claim 5, wherein:

said first tool locking mechanism is configured to lock a drill bit therein, and said second tool locking mechanism is configured to lock a screwdriver bit therein.

7. The drill and drive apparatus of claim 1, wherein said first section of said holder body is axially adjacent to said second section of said holder body.

8. A tool holder for a drill and drive apparatus, said tool holder comprising:

a holder body defining a first tool recess and having (i) a first section with a first maximum width and at least one ball aperture communicating with said first tool recess, and (ii) a second section with a second maximum width less than said first width; and a first tool locking mechanism at a first end portion thereof, said first tool locking mechanism having (i) a tool locking collar positioned around said holder body and positionable between a tool lock position and a tool release position, said tool locking collar including a back-up ring attached at an end thereof, (ii) at least one ball positioned within said at least one ball aperture, wherein said at least one ball extends into said first tool recess when said tool locking collar is positioned in said tool lock position, and said at least one ball is locatable away from said first tool recess when said tool locking collar is positioned in said tool release position, and (iii) a tool spring, positioned around said second section of said holder body, which exerts a force upon said back-up ring to bias said tool locking collar toward said tool lock position.

9. The tool holder of claim 8, further comprising a second tool locking mechanism at a second end portion thereof, wherein:

said holder body further defines a second tool recess and a magnet recess, and said second tool locking mechanism includes a magnet positioned within said magnet recess to generate a magnetic field within said second tool recess.

10. The tool holder of claim 9, wherein:

said first tool locking mechanism is configured to lock a drill bit therein, and said second tool locking mechanism is configured to lock a screwdriver bit therein.

11. The tool holder of claim 8, wherein said first section of said holder body is axially adjacent to said second section of said holder body.

12. The tool holder of claim 8, wherein said back-up ring has an inner diameter less than said width of said first section.

13. The tool holder of claim 12, wherein said back-up ring is bisected in an axial direction.

14. The tool holder of claim 12, wherein said back-up ring comprises two parts.

15. The tool holder of claim 12, wherein:

said back-up ring of said tool locking collar is positioned around said second section of said holder body, said first tool locking mechanism includes a split ring positioned around said second section of said holder body, and said tool spring is retained within said tool locking collar between said back-up ring and said split ring.

16. The tool holder of claim 8, wherein said back-up ring has an outer surface, said end of said tool locking collar having an inner surface attached to said outer surface of said back-up ring.

17. The tool holder of claim 8, wherein:

said tool holder includes a second end portion opposite said first end portion, and said second section of said holder body is disposed between said first section of said holder body and said second end portion of said tool holder.

18. A tool holder for a drill and drive apparatus, said tool holder comprising:

a holder body defining a first tool recess open at a first end of said body to receive a tool therein, said holder body further including (i) a first section adjacent said first end with a first outer dimension and at least one ball aperture extending therethrough in communication with said first tool recess, and (ii) a second section adjacent said first section and with a second outer dimension less than said first outer dimension; and a first tool locking mechanism at said first end and including;

a tool locking collar disposed around said first and second sections of said holder body and together with said holder body defining an annular chamber, said tool locking collar slidable along said holder body between a tool lock position and a tool release position in which the annular chamber is disposed about said at least one ball aperture;

at least one ball disposed within said at least one ball aperture and movable within said aperture between a position extending into said first tool recess when said tool locking collar is positioned in said tool lock position, and a position located away from said first tool recess when said tool locking collar is in said tool release position; and a biasing mechanism disposed within said annular chamber operable to bias said tool locking collar toward said tool lock position.

19. The tool holder of claim 18, further comprising a second tool locking mechanism at an opposite second end of said tool holder, wherein:

said holder body further defines a second tool recess and a magnet recess at said second end of said tool holder, and said second tool locking mechanism includes a magnet positioned within said magnet recess to generate a magnetic field within said second tool recess.

20. The tool holder of claim 19, wherein:

said second tool locking mechanism is configured to lock a screwdriver bit therein, said screwdriver bit including a metallic material, and magnetic attraction between said magnet and said screwdriver bit locks said screwdriver bit to said holder body.

21. The drill and drive apparatus of claim 1, wherein:

said first section of said tool holder body extends for a first distance, said first section possesses a first uniform outer diameter throughout said first distance, said second section of said tool holder body extends for a second distance, and said second section possesses a second uniform outer diameter throughout said second distance.

22. The tool holder of claim 8, wherein:

said first section of said tool holder body extends for a first distance, said first section possesses a first uniform outer diameter throughout said first distance, said second section of said tool holder body extends for a second distance, and said second section possesses a second uniform outer diameter throughout said second distance.

23. The tool holder of claim 18, wherein:

said first section of said tool holder body extends for a first distance, said first section possesses a first uniform outer diameter throughout said first distance, said second section of said tool holder body extends for a second distance, and said second section possesses a second uniform outer diameter throughout said second distance.

* * * * *